(12) United States Patent
Zha et al.

(10) Patent No.: US 10,824,008 B2
(45) Date of Patent: Nov. 3, 2020

(54) BACKLIGHT MODULE AND DISPLAY DEVICE

(71) Applicant: Wuhan China Star Optoelectronics Technology Co., Ltd., Wuhan (CN)

(72) Inventors: Guowei Zha, Shenzhen (CN); Hongqing Cui, Shenzhen (CN); Changwen Ma, Shenzhen (CN); Yan Cheng, Shenzhen (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 16/211,500

(22) Filed: Dec. 6, 2018

(65) Prior Publication Data

US 2019/0302529 A1 Oct. 3, 2019

Related U.S. Application Data

(63) Continuation of application No. PCT/CN2018/097491, filed on Jul. 27, 2018.

(30) Foreign Application Priority Data

Mar. 27, 2018 (CN) .......................... 2018 1 0260126

(51) Int. Cl.
*G02F 1/1335* (2006.01)
*G02F 1/13357* (2006.01)
*G02F 1/1333* (2006.01)

(52) U.S. Cl.
CPC .. *G02F 1/133603* (2013.01); *G02F 1/133305* (2013.01); *G02F 1/133528* (2013.01);
(Continued)

(58) Field of Classification Search
None
See application file for complete search history.

(56) References Cited

U.S. PATENT DOCUMENTS 6,151,091 A * 11/2000 Muramatsu ........... G02F 1/1345
349/149
2010/0007817 A1 1/2010 Kim
(Continued)

FOREIGN PATENT DOCUMENTS

CN 101086577 A 12/2007
CN 101779074 A 7/2010
(Continued)

OTHER PUBLICATIONS

Chinese Second Office Action and Written Opinion for related Chinese Application No. 201810260126.0, dated Jun. 3, 2020, 13 pages.

*Primary Examiner* — Richard H Kim
(74) *Attorney, Agent, or Firm* — Brinks Gilson & Lione

(57) ABSTRACT

The present disclosure provides backlight module and display module. The backlight module may include: a display module and a backlight module, the backlight module is configured to face to the display module, the display module may include a first substrate, a second substrate and a liquid crystal layer interposed between the first substrate and the second substrate; the display module comprising a display region and a non-display region, at least one side of the second substrate extends along the non-display region and is bent below the backlight module so as to cover a portion of the backlight module.

18 Claims, 2 Drawing Sheets

(52) U.S. Cl.
CPC ............... *G02F 1/133606* (2013.01); *G02F 2001/133612* (2013.01); *G02F 2001/133614* (2013.01)

(56) References Cited

U.S. PATENT DOCUMENTS

| | | | |
|---|---|---|---|
| 2010/0097541 A1* | 4/2010 | Tomiyoshi | G02F 1/133603 349/61 |
| 2011/0019126 A1* | 1/2011 | Choi | H05K 1/0206 349/61 |
| 2014/0042406 A1 | 2/2014 | Degner et al. | |
| 2014/0104850 A1* | 4/2014 | Yamamoto | H01L 33/486 362/311.02 |
| 2014/0232956 A1 | 8/2014 | Kwon et al. | |
| 2017/0038039 A1 | 2/2017 | Lee et al. | |
| 2018/0120492 A1* | 5/2018 | Lee | G02B 6/005 |
| 2018/0143482 A1* | 5/2018 | Jin | G02F 1/133305 |
| 2018/0180911 A1* | 6/2018 | Odaka | G02F 1/133305 |

FOREIGN PATENT DOCUMENTS

| | | |
|---|---|---|
| CN | 201935061 U | 8/2011 |
| CN | 203478019 U | 3/2014 |
| CN | 206147235 U | 5/2017 |
| CN | 106980209 A | 7/2017 |
| KR | 20120018677 A | 3/2012 |
| KR | 20120029854 A | 3/2012 |

\* cited by examiner

BACKLIGHT MODULE AND DISPLAY DEVICE

CROSS REFERENCE TO RELATED APPLICATIONS

The present application is a continuation-application of International (PCT) Patent Application No. PCT/CN2018/097491 filed on Jul. 27, 2018, which claims foreign priority of Chinese Patent Application No. 201810260126.0, filed on Mar. 27, 2018 in the National Intellectual Property Administration of China, the entire contents of which are hereby incorporated by reference.

TECHNICAL FIELD

This disclosure generally relates to the field of display technology, and more particularly, to backlight module and display apparatus.

BACKGROUND

With the continuous development of wearable application equipment such as intelligent glasses and watches, the requirement of the display panel industry on the flexible display device is continuously increased. The organic light emitting diode display device (OLED) has the characteristics of no backlight source, thin thickness, wide viewing angle, and high reaction speed and the like, so that the natural advantages of flexible display can be achieved. Facing the competition of the flexible OLED, the traditional liquid crystal display technology has gradually adopted flexible substrates so that the flexible and the curved surface and the like can be broken through, and therefore, it is the time of flexible and curved surface displays.

At present, an upper border, a left border, and a right border of a display screen can be narrowed so as to meet the requirements of the full screen. However, the data line fanout and a bonding area connected to the peripheral circuit needs to be arranged at a lower border, so that further compression of the lower border has become a technical problem that needs to be solved urgently.

Meanwhile, the liquid crystal display industry has adopted a technical solution of using side-in type light, and the LED light bar located at the lower border of the display screen, which has a certain amount of thickness. Due to the fact that the LED as a point light source, the light needs to be uniformly diffused by a light guide plate to avoid a phenomenon of hotspot near LED light bar. Accordingly, a light mixing distance is required, and the compression of the light mixing distance usually reduces the sharp attenuation of the backlight efficiency, so that the backlight lower border of the liquid crystal module has a limit value. Therefore, the size of the lower border of the liquid crystal display screen becomes a main factor for realizing full screen display (extremely narrow border).

SUMMARY

The present disclosure provides backlight module and display apparatus, in order to solve the problem that the lower border is too wide due to the width of LED light bar and the light mixing distance.

In order to solve to above technical problem, the present disclosure provides a backlight module comprising a flexible substrate, a plurality of light-emitting diodes, a fluorescent film, a diffusion film and a brightening film; wherein the flexible substrate comprises a driving circuit and a non-backlight region formed on the flexible substrate, one side of the flexible substrate extends along the non-backlight region and is bent below a backlight region of the flexible substrate, the light-emitting diodes are arranged on the backlight region of the flexible substrate in an array form, the fluorescent film, the diffusion film and the brightening film are sequentially formed above the light-emitting diodes.

In order to solve to above technical problem, the present disclosure provides a display apparatus, comprising: a display module and a backlight module mentioned above, backlight module configured to face to the display module; wherein, the display module comprises a first substrate, a second substrate and a liquid crystal layer interposed between the first substrate and the second substrate; the display module comprises a display region and a non-display region, at least one side of the second substrate extends along the non-display region and is bent below the backlight module so as to cover a portion of the backlight module.

The advantage of the disclosure is: providing backlight module and display apparatus, which can effectively compress the light mixing distance of the light-emitting diodes by arranging the light emitting diodes in a dense array form, and decrease the width of the lower border of the backlight module to achieve the full screen by bending the non-backlight region of the flexible substrate below the backlight region.

DETAILED DESCRIPTION

In order to more clearly illustrate embodiments of the disclosure or prior art, following figures described in embodiments or prior art will be briefly introduced, it is obvious that the drawings are merely some embodiments of the disclosure, a person skilled in the art can obtain other figures according to these figures without creativity.

The subject technology will now be described in detail with reference to the accompanying drawings and exemplary embodiments.

Figure 1:
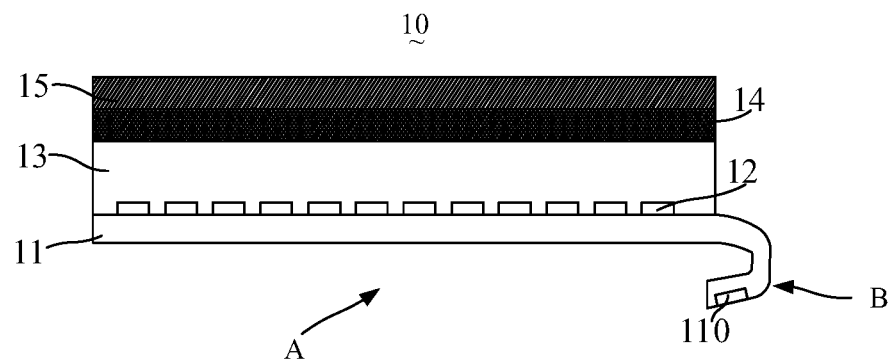
FIG. 1 is a schematic structural view of the first embodiment of the backlight module of the present disclosure.
Figure 2:
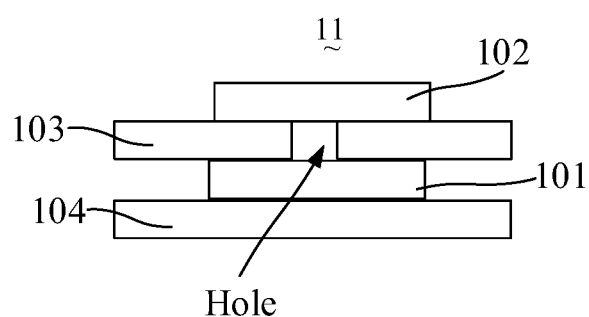
FIG. 2 is a schematic structural view of an embodiment of a flexible substrate in the backlight module of the present disclosure.

Referring to FIG. 1 and FIG. 2, FIG. 1 is a schematic structural view of the first embodiment of the backlight module of the present disclosure, and FIG. 2 is a schematic structural view of an embodiment of a flexible substrate in the backlight module of the present disclosure. As shown in FIG. 1, the backlight module 10 of the present disclosure may include a flexible substrate 11, a plurality of light-emitting diodes 12, a fluorescent film 13, a diffusion film 14 and a brightening film 15.

The flexible substrate 11 in the present disclosure may be made of one of colorless polyimide (PI), polycarbonate (PC), polynorbornene (PNB) and polyethylene terephthalate (PET). In an embodiment, the flexible substrate 11 is made of Polyimide.

In some embodiments, the flexible substrate 11 may include a backlight region A and a non-backlight region B, one side of the flexible substrate 11 may extend along the non-backlight region B and be bent below the backlight region A of the flexible substrate 11. In some embodiments, the flexible substrate 11 may further include a driving circuit 110, the driving circuit 110 may be disposed on the non-backlight region B of the flexible substrate 11. The light-emitting diodes 12 may be arranged on the backlight region A of the flexible substrate 11 in an array form, the fluorescent film 13, the diffusion film 14 and the brightening film 15 may be sequentially formed above the light-emitting diodes 12, so that the backlight module 10 can be made.

The backlight module 10 in the present embodiment may use a direct type backlight to arrange the light-emitting diodes 12 on the backlight region A of the flexible substrate 11. The driving circuit 110 on the non-backlight region B is bent below the backlight region A of the flexible substrate 11. In the present embodiment, a width of a lower border of the backlight module 10 can be decreased effectively by bending one side of the flexible substrate 11 below the backlight region A, and a width of a lower border of a display apparatus can be decreased after the backlight module 10 is assembled with a display module, so that full screen is achieved.

Referring to FIG. 2, the flexible substrate 11 may include a first wire layer 101 and a second wire layer 102, the first wire layer 101 may be electrically connected with the second wire layer 102, the first wire layer 101 may be connected to the driving circuit 110, and the second wire layer 102 may be connected to the light-emitting diodes 12. The flexible substrate 11 may have a film stack structure, a thickness range of the flexible substrate 11 is 0.02-0.2 mm, further, the thickness range is 0.05-0.18 mm, and may be specifically 0.11 mm, 0.15 mm, and the like, which is not limited herein. In a specific preparation process, a part of the flexible substrate 11 on the lower border of the backlight module 10 (corresponding to the non-backlight region B) can be bent, and be bent below the backlight region A after the display module and the backlight module are assembled.

In some embodiments, the flexible substrate 11 may include the first wire layer 101, the second wire layer 102, a insulation layer 103 and a sub-flexible substrate 104, the insulation layer 103 may be disposed between the first wire layer 101 and the second wire layer 102, the first wire layer 101 and the second wire layer 102 may be electrically connected to each other through a hole in the insulation layer 103. The first wire layer 101 may be arranged inside the flexible substrate 11, and the second wire layer 102 may be arranged outside the flexible substrate 11 and face to the light-emitting diodes 12. In other some embodiments, the flexible substrate 11 also may include multiple of wire layers so as to achieve electrical connection between different layers, or not include the sub-flexible substrate 104.

In some embodiments, the second wire layer 102 may include a plurality of anode bonding pads (not shown) and a plurality of cathode bonding pads (not shown) which are one to one corresponded to the light-emitting diodes 12. The light-emitting diodes 12 may be electrically connected to the second wire layer 102 through the anode bonding pads and the cathode bonding pads correspond to the light-emitting diodes 12, and be electrically connected to the driving circuit 110 by the first wire layer 101, so that the driving circuit 110 can turn on/off the light-emitting diodes 12.

In some embodiment, the light-emitting diodes 12 may be blue mini-LEDs, and be arranged on the flexible substrate 11 in an array form. The light-emitting diodes 12 may be bonded to the anode bonding pads and the cathode bonding pads by at least one of solder paste, silver glue, and anisotropic conductive film (ACF), and the like, so that the light-emitting diodes 12 may be fixed and electrically connected to the driving circuit 110. In other some embodiments, the light-emitting diodes 12 may be bonded to the anode bonding pads and the cathode bonding pads by a typical COB (chip on board) process, which not be described herein.

When the light-emitting diodes 12 are the blue mini-LEDs, the fluorescent film 13 may be a yellow fluorescent film so as to excite yellow light by blue light emitted by the blue mini-LEDs, and the yellow light can mix with the blue light that do not excite the yellow light to obtain white light. Further, the fluorescent film 13 may be stocked above the blue mini-LEDs and around the blue mini-LEDs in a film structure.

In some embodiments, a size of each of the light-emitting diodes 12 may be 100-1000 μm, specifically 100 μm, 550 μm, 1000 μm, and the like, which is not further limited herein. Due to the light-emitting diodes 12 are arranged in a dense array form, a light mixing distance of the mini-LEDs can be effectively compressed, so that the light mixing distance of the backlight module 10 may be smaller than 1000 μm, and the thickness difference between the backlight module 12 and that of the existing small-size side-in type LCD may be small, so that the light an thin requirements of existing mobile equipment cannot be influenced.

In addition, in some embodiments, the light-emitting diodes 12 may be ultraviolet light emitting diodes, the fluorescent film 13 may be formed by mixing at least two types of fluorescent power, and specifically can be formed by mixing red, green and blue fluorescent powers, and be mixed under ultraviolet light emitted by the ultraviolet light emitting diodes to obtain white light. Of course, the fluorescent film 13 can also be formed by mixing two complementary color fluorescent powers, such as yellow and blue fluorescent powers, magenta and green fluorescent powers, and red and cyan fluorescent powers mixed with silica gel, and be excited under the ultraviolet light emitted by the ultraviolet light emitting diode to obtain the white light.

Figure 3:
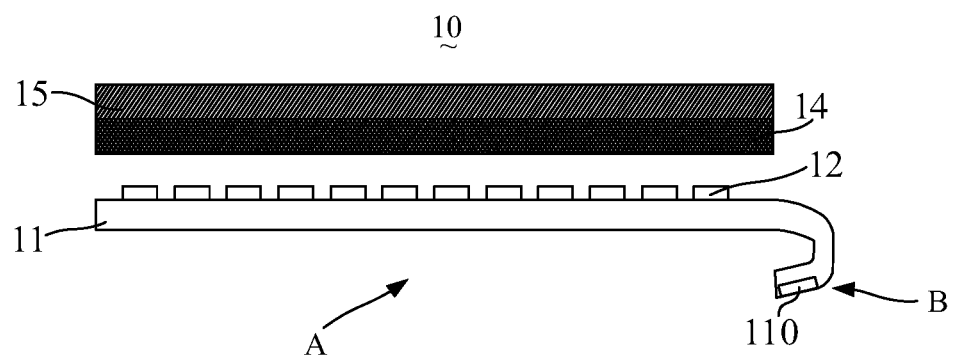
FIG. 3 is a schematic structural view of the second embodiment of the backlight module of the present disclosure.

Furthermore, the light-emitting diodes 12 may be three primary color light emitting diodes, and the light emitted by the three primary color light emitting diodes can be directly mixed to obtain the white light, that is the fluorescent film 13 cannot be needed in this technical solution. As shown in FIG.3, FIG. 3 is a schematic structural view of the second embodiment of the backlight module of the present disclosure.

The diffusion film 14 may mainly play a role in correcting the diffusion angle in the backlight module 10, so that the light radiation area can be enlarged. The light source emitted by the light-emitting diodes 12 can become a secondary light source which may be larger in area, better in uniformity and more stable in chromaticity after being diffused by the diffusion film 14 The basic structure of the diffusion film 14 may be that optical scattering particles are coated on a transparent base material, such as PET, the preparation method and the preparation process thereof can refer to a method and a process for preparing the display panel in the prior art, which is not limited in the present disclosure. The light intensity of the unit area of the secondary light source may be reduced due to the light source diffused by the diffusion film 14 so as to not meet the brightness requirement of the display panel, so that the film which is able to increase the brightness may be needed, namely the brightening film 15. The prism film may be the most widely used brightening product at present, so that the prism film may be one of the brightening films, the prism film may be a transparent plastic film, and the thickness of the prism film ranges from 50 μm to 300 μm, a layer of prism structure may be uniformly and orderly covered on the upper surface of the prism film; the prism film may be arranged between the diffusion film 14 of the backlight module 10 and the display module so as to improve the angle distribution of the light, the light which may be uniformly diffused by the diffusion film 14 to each angle can be converged to an axial angle which is a front view angle, and the brightness of the axial angle can be improved under the condition that the total luminous flux is not increased.

In above embodiments, the light mixing distance of the light-emitting diodes 12 can be effectively compressed by arranging the light-emitting diodes 12 in a dense array form, the width of the upper, lower, left and right borders of the backlight module 10 may be the same by using a direct type backlight, and the width of the borders can be limited only by a width of a rubber frame and the stacking tolerance of the films, so that the width of the lower border of the backlight module 10 can reach the width of a right border and a left border of the side-in type backlight module, that is the width of the lower border of the backlight module 10 can be reduced to 0.5-1 mm, so that the backlight module 10 with narrow borders can be achieved.

Figure 4:
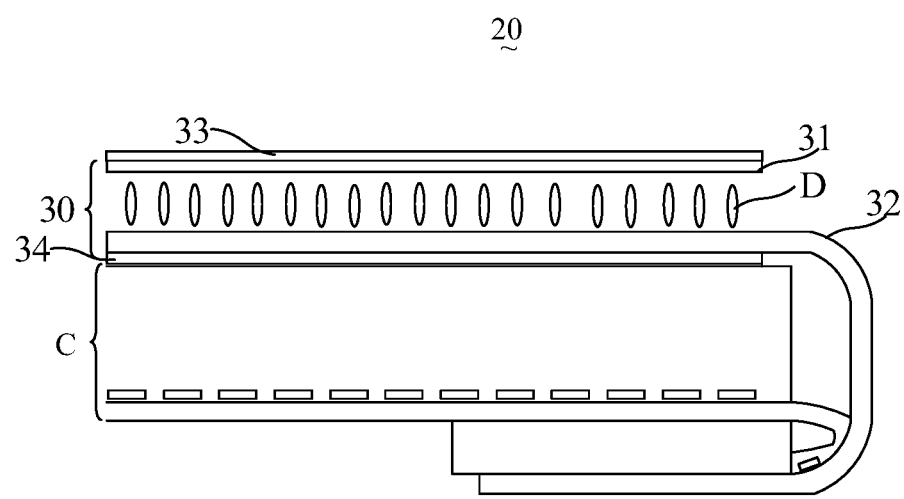
FIG. 4 is a schematic structural view of an embodiment of the display apparatus of the present disclosure.

Referring to FIG. 4, FIG. 4 is a schematic structural view of an embodiment of the display apparatus of the present disclosure. As shown in FIG. 4, the display apparatus 20 may include a display module 30 and the backlight module C described in above embodiments, the backlight module C may be configured to face the display module 30. The detail of the specific structure of the backlight module C can be described in detail in the above embodiments, and are not described in detail herein.

In some embodiments, the display module 30 may further include: a first substrate 31, a second substrate 32 and a liquid crystal layer D sandwiched between the first substrate 31 and the second substrate 32. The first substrate 31 may be a color film substrate, and the second substrate 32 may be an array substrate. Of course, in other some embodiments, the first substrate 31 may be an array substrate, and the second substrate 32 may be a color film substrate, which are not limited herein.

In an embodiment, the second substrate 32 may be array substrate, and the deflection of the liquid crystal layer D may be driven by providing thin film transistors. The second substrate 32 may be a flexible member and made of one of colorless polyimide (PI), polycarbonate (PC), polynorbornene (PNB) and polyethylene terephthalate (PET). In an embodiment, the second substrate 11 may be made of Polyimide.

In some embodiments, the second substrate 32 may include a data line fanout area (Data Line Fanout), a driving circuit binding area (IC bonding) and a flexible circuit board bonding area (FPC bonding). The process of the second substrate 32 may be the same as the traditional LCD structure substantially, only the colorless PI resistant the low temperature (300-400° C.) may be used to replace the traditional glass substrate, therefore a array process section may need to be matched by a low temperature compatible process.

The display module 30 may include a display region and a non-display region. At least one side of the second substrate 32 may extend along the non-display region and be bent below the backlight module C so as to cover a portion of the backlight module C. Specifically, after the display module 30 and the backlight module C are assembled, a lower border area of the display module 30 may be bent below the backlight region of the backlight module C, and fixed by adhesive, so that the data line fanout area (Data Line Fanout) and the driving circuit binding area of the lower border area of the display module 30 may be bent to the back surface of the backlight module C, and the width of the lower border area can be reduced visually, and the full display screen can be realized.

In some embodiments, a thickness of the backlight module C may be about 1 mm, and the second substrate 32 may be bent and fixed to the flexible substrate of backlight module C. Accordingly, a bending radius of the second substrate 32 may be about half of the thickness of the backlight module C, and have a large radius of curvature to avoid electrical instability caused by the fact that the second substrate 32 may be broken and the like at the bending position. In addition, the thickness of the lower border area of the display module 30 (the width of the border of the bending area requires a whole machine accommodating space) may be inevitably increased due to the bending radius of the second substrate 32, but the low-thickness characteristic of the mini-LED backlight design in the backlight module C can ensure a less width loss in the border, and the design of the narrow-frame display panel may be facilitated.

In some embodiments, the display module 30 may further include a first polarizer 33 and a second polarizer 34, the first polarizer 33 may be arranged on a surface away from the liquid crystal layer D, of the first substrate 31, and the second polarizer 34 may be arranged on a surface, away from the liquid crystal layer D, of the second substrate 32. The structure of the first polarizer 33 and the second polarizer 34, the first substrate 31 and the liquid crystal layer D may be conventional and be not specifically limited herein. In other words, when the display module 30 is displayed as a hard screen (relative to a flexible display), a material which is the same as that of an existing hard screen may be used, that is the first substrate 31 may still use a glass substrate which can be compatible with an existing liquid crystal display technology, the first polarizer 33, the second polarizer 34 and the liquid crystal box can do not need to consider the flexible reliability design. Certainly, the structure is not excluded for flexible display, in addition to the second base plate 32, the rest structures may also need to be synchronously designed to be flexible.

The display apparatus 20 can be a mobile phone, a tablet computer, a television and a display, a notebook computer, a digital photo frame, a navigator and other products or components with a display function.

In above embodiments, the width of the lower border of the backlight module can be reduced by bending the driving circuit 110 on the non-backlight region of the flexible substrate of the backlight module below the backlight region, and when the backlight module and the display module are assembled, the non-display region (may include the data line fanout area, the driving circuit binding area and the flexible circuit board area) of the second substrate of the display module may be bent below the backlight module to cover a side of the backlight module, so that the width of the lower border of the display apparatus can be reduced, and the full screen display can be achieved by using the backlight module with narrow borders and the display module with narrow borders.

In summary, It may be easy for the skilled in the art to understand that backlight module and display apparatus is provided by the present disclosure, the width of the lower border of the backlight module can be reduced by bending the driving circuit 110 on the non-backlight region of the flexible substrate of the backlight module below the backlight region, and when the backlight module and the display module are assembled, the non-display region (may include the data line fanout area, the driving circuit binding area and the flexible circuit board area) of the second substrate of the display module may be bent below the backlight module to cover a side of the backlight module, so that the width of the lower border of the display apparatus can be reduced, and the full screen display can be achieved by using the backlight module with narrow borders and the display module with narrow borders.

The above description merely depicts some exemplary embodiments of the present disclosure, but is intended to limit the scope of the present disclosure. It should be understood that any equivalent structural variations or equivalent process flow variations of the described embodiments and the accompanying drawings, or direct or indirect applications of the described embodiments and the accompanying drawings in other relevant technical fields, shall all be covered within the scope of protection of the present disclosure.

What is claimed is:

1. A backlight module used in a display apparatus having a flexible second substrate, the backlight module comprising:
   a flexible substrate having a backlight region and a non-backlight region extending from an end of the backlight region, the flexible substrate comprising a driving circuit disposed on the non-backlight region;
   a plurality of light-emitting diodes disposed on the backlight region of the flexible substrate in an array, wherein a portion of the non-backlight region of the flexible substrate extends from and is bent below the flexible substrate with the backlight region to form a bent portion of the non-backlight region, wherein an inner side of the bent portion of the non-backlight region is empty; and
   a fluorescent film, a diffusion film and a brightening film sequentially disposed on the light-emitting diodes, wherein each of the light-emitting diodes is 100-1000 μm in length per side, and a thickness of the flexible substrate is 0.02-0.2 mm;
   wherein, a side of the backlight module where the bent portion of the non-backlight region is located is configured to be covered by a portion of the second substrate bent below the backlight module and including a data line fanout area, a driving circuit binding area and a flexible circuit board bonding area.

2. The backlight module of claim 1, wherein, a distance between every two adjacent light-emitting diodes is 100-2000 μm.

3. The backlight module of claim 1, wherein, the flexible substrate further comprises a first wire layer and a second wire layer, the first wire layer is electrically connected to the second wire layer through a hole, the first wire layer is connected to the driving circuit, and the second wire layer is connected to the light-emitting diodes.

4. The backlight module of claim 3, wherein, the second wire layer comprises a plurality of anode bonding pads and a plurality of cathode bonding pads which correspond to the light-emitting diodes.

5. A backlight module used in a display apparatus having a flexible second substrate, the backlight module comprising:
   a flexible substrate, comprising a driving circuit arranged on a non-backlight region;
   a plurality of light-emitting diodes disposed on the backlight region of the flexible substrate in an array, wherein a portion of the non-backlight region of the flexible substrate extends from and is bent below a backlight region to form a bent portion of the non-backlight region, wherein an inner side of the bent portion of the non-backlight region is empty; and
   a fluorescent film, a diffusion film and a brightening film sequentially disposed on the light-emitting diodes;
   wherein, a side of the backlight module where the bent portion of the non-backlight region is located is configured to be covered by a portion of the second substrate bent below the backlight module and including a data line fanout area, a driving circuit binding area and a flexible circuit board bonding area.

6. The backlight module of claim 5, wherein each of the light-emitting diodes is 100-1000 μm in length per side.

7. The backlight module of claim 6, wherein, a distance between every two adjacent light-emitting diodes is 100-2000 μm.

8. The backlight module of claim 5, wherein, a thickness of the flexible substrate is 0.02-0.2 mm.

9. The backlight module of claim 5, wherein, the flexible substrate further comprises a first wire layer and a second wire layer, the first wire layer is electrically connected to the second wire layer through a hole, the first wire layer is connected to the driving circuit, and the second wire layer is connected to the light-emitting diodes.

10. The backlight module of claim 9, wherein, the second wire layer comprises a plurality of anode bonding pads and a plurality of cathode bonding pads which correspond to the light-emitting diodes.

11. A display apparatus, comprising:
    a display module;
    a backlight module configured to face to the display module;
    wherein, the display module comprises a first substrate, a second substrate and a liquid crystal layer sandwiched between the first substrate and the second substrate;
    the display module further comprises a display region and a non-display region, at least a portion of the second substrate extends from and is bent below the backlight module covering a portion of the backlight module, wherein a portion of the second substrate bent below the backlight module and covering a portion of the backlight module includes a data line fanout area, a driving circuit binding area and a flexible circuit board bonding area;
    wherein, the backlight module comprises a flexible substrate, a plurality of light-emitting diodes, a fluorescent film, a diffusion film and a brightening film; the flexible substrate comprises a driving circuit and a non-backlight region, a portion of the non-backlight region of the flexible substrate extends from and is bent below a backlight region to form a bent portion of the non-backlight region, wherein an inner side of the bent portion of the non-backlight region is empty, the plurality of light-emitting diodes are disposed on the backlight region in an array, the fluorescent film, the diffusion film and the brightening film are sequentially disposed on the light-emitting diode.

12. The display apparatus of claim 11, wherein, a bending radius of the second substrate is substantially half of a thickness of the backlight module.

13. The display apparatus of claim 11, wherein, the display module further comprises a first polarizer and a second polarizer, the first polarizer is disposed on a surface of the first substrate away from the liquid crystal layer, and the second polarizer is disposed on a surface of the second substrate away from the liquid crystal layer.

14. The display apparatus of claim 11, wherein, the second substrate is a flexible member.

15. The display apparatus of claim 11, wherein each of the light-emitting diodes is 100-1000 μm in length per side.

16. The display apparatus of claim 15, wherein, a distance between every two adjacent light-emitting diodes is 100-2000 μm.

17. The display apparatus of claim 11, wherein, the flexible substrate comprises a first wire layer and a second wire layer, the first wire layer is electrically connected to the second wire layer through a hole, the first wire layer is connected to the driving circuit, and the second wire layer is connected to the light-emitting diodes.

18. The display apparatus of claim 11, wherein, the second wire layer comprises a plurality of anode bonding pads and a plurality of cathode bonding pads which correspond to the light-emitting diodes.

* * * * *